United States Patent [19]
Bargel et al.

[11] 3,992,060
[45] Nov. 16, 1976

[54] CONVEYING APPARATUS

[75] Inventors: Gunther Bargel, Werne; Willy Tyslauk, Altlunen; Eberhard Unger, Altlunen; Wolfgang Müller, Altlunen, all of Germany

[73] Assignee: Gewerkschaft Eisenhutte Westfalia, Westfalia, Germany

[22] Filed: May 2, 1975

[21] Appl. No.: 574,200

Related U.S. Application Data

[63] Continuation of Ser. No. 413,999, Nov. 8, 1973, abandoned.

[30] Foreign Application Priority Data

Nov. 20, 1972 Germany.......................... 2256917

[52] U.S. Cl.................................. 299/67; 198/619; 198/725
[51] Int. Cl.² ................. E21C 35/02; B65G 23/00; B65G 15/60
[58] Field of Search.................. 198/7 R, 9, 36, 168, 198/203, 204, 172, 174; 299/64–67

[56] References Cited
UNITED STATES PATENTS

| | | |
|---|---|---|
| 2,798,714 | 7/1957 | Russell.............................. 198/7 R |
| 2,877,882 | 3/1959 | Fitzgerald.............................. 198/9 |

FOREIGN PATENTS OR APPLICATIONS

| | | |
|---|---|---|
| 847,427 | 8/1952 | Germany.......................... 198/203 |

*Primary Examiner*—Evon C. Blunk
*Assistant Examiner*—Joseph E. Valenza
*Attorney, Agent, or Firm*—Sughrue, Rothwell, Mion, Zinn & Macpeak

[57] ABSTRACT

Conveying apparatus which may be embodied as a jib for a cutter-loader machine in tunnelling or mining applications. The apparatus employs a scraper-chain assembly which in known manner is entrained around rotatable members and is circulated within guide channels with side surfaces adjoined by a base or floor surface. An electric drive motor is coupled via reduction-ratio gearing unit to one or other of the rotatable members. The motor and the gearing each have housings joined together end-to-end and the housing of the motor is joined to at least one other body section of the apparatus. The housings and this body section have the same cross-sectional profile defining the aforesaid guide channels.

15 Claims, 5 Drawing Figures

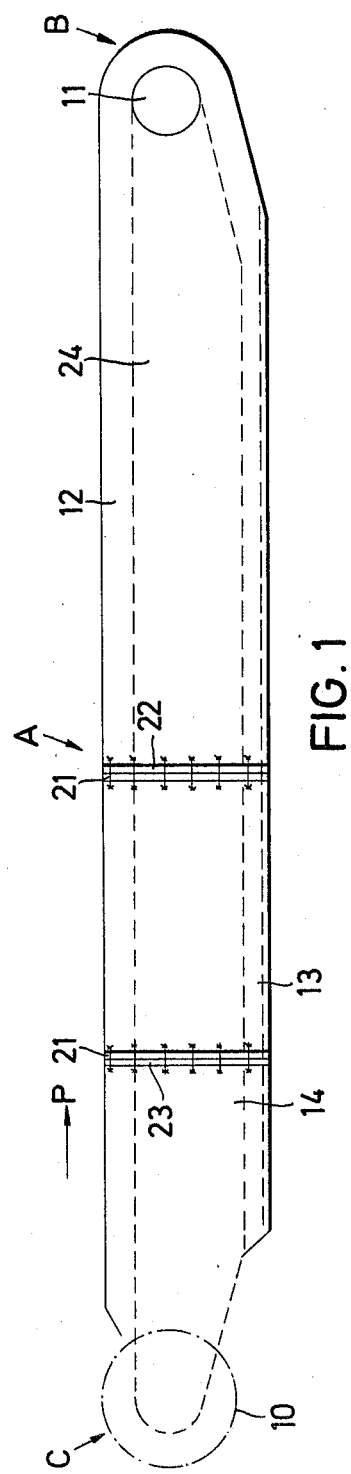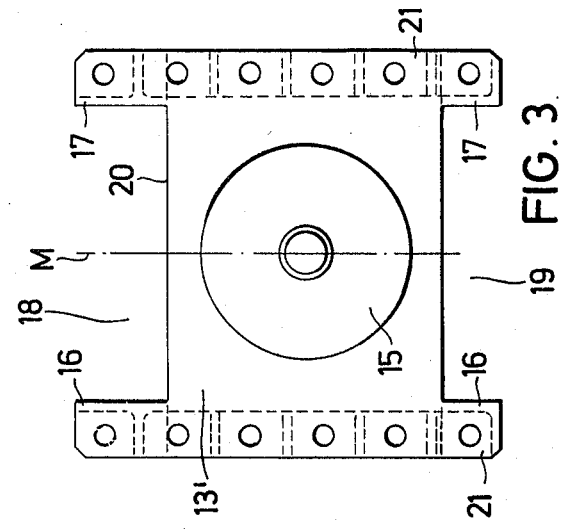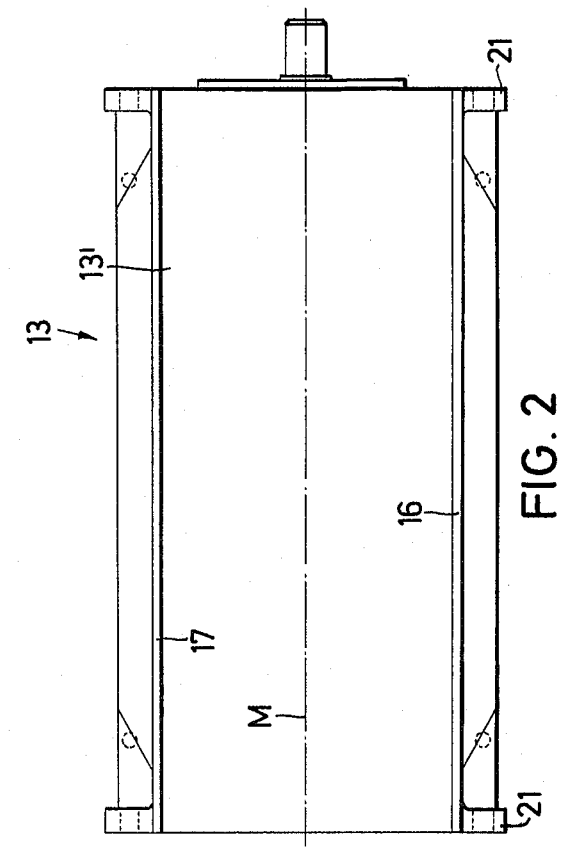

CONVEYING APPARATUS

This is a continuation of application Ser. No. 413,999, filed Nov. 8, 1973, now abandoned.

BACKGROUND TO THE INVENTION

The present invention relates to conveying apparatus particularly, but not solely, for use with cutter-loader machines, in underground tunnels or in mine workings.

It is well known to construct conveying apparatus from a scraper-chain assembly which moves along a conveying surface. Thus in the so-called longwall conveyors it is known to have one or several chains connected to scraper elements or flights which are spaced apart longitudinally of the chain or chains. This assembly is entrained over drums or the like and is then circulated along a series of channel sections providing the conveying surface and defining guide channels primarily for guiding the scraper elements. It is also known to utilize cutter-loader machines employing similar forms of scraper-chain assemblies. Such machines are usually self-propelled, e.g. mounted on endless tracks, and are used for driving tunnels or winning materials such as clay or other minerals. In such machines it is usual to employ a jib which can be raised and lowered or swung from side-to-side. This jib may have cutting means at one end and may have a scraper-chain assembly moved along the body of the jib to transfer material away from the cutting means. The scraper-chain assembly can be entrained around rotatable members or drums at the ends of the jib and the cutting means can be driven indirectly by the scraper-chain assembly. Various drive arrangements have been employed with both these types of conveying apparatus. It is, for example, common, especially with longwall conveyors, to provide conventional drive motors at one side of the conveyor so that the motor and pertinent coupling project laterally from the main part of the apparatus. The drive motor is normally a heavy unit and it is usually difficult in underground working to provide sufficient space for the motor in other positions.

A general object of this invention is to provide an improved form of conveying apparatus.

A further object of the invention is to provide an improved drive system for conveying apparatus. Another object of the invention is to provide a drive system for conveying apparatus which is simple to assemble and disassemble, which utilizes minimum space and which is adaptable.

SUMMARY OF THE INVENTION

According to the invention there is provided conveying apparatus comprising a scraper-chain assembly adapted to move in a circulatory path and along at least one guide channel and an electric motor for moving said assembly, the motor having a housing which defines part of said at least one guide channel. In accordance with the invention the housing of the motor can form a structural component of the actual conveyor body. This greatly simplifies the construction of the drive system for the conveyor and ensures that no undue space is taken up by the drive system. This, moreover, allows the weight of the drive system to be more evenly distributed.

Preferably the scraper-chain assembly is entrained around rotatable members at the ends of said at least one guide channel and at least one of the rotatable members is driven by said motor to move the assembly. The rotatable members can take the form of shafts carrying sprocket wheels engaging with the chain of the scraper-chain assembly. There may be provided two oppositely-disposed guide channels part of each of the guide channels being defined by the motor housing. Each of these guide channels have a generally U-shaped cross-sectional profile with side walls and a floor surface extending between said side walls. Normally the drive motor would be coupled to a reduction-ratio gearing unit and in accordance with a further feature of the invention this gearing unit can also have a housing which also defines part of said at least one guide channel. The motor housing and gearing unit housing can be connected together at their ends and the motor housing may additionally be connected at its other end to a body section of the apparatus also defining part of the channel section or sections.

The conveying apparatus may be designed for use in an underground mine working, i.e. as a short-face or longwall conveyor, or as a jib of a cutter-loader. Preferably, in this latter regard some form of cutting means is located at one end of the jib and is driven indirectly by the scraper-chain assembly or directly by the drive motor.

It is possible to provide a drive motor and gearing unit at both ends of the apparatus and this is convenient where the power requirements cannot be met by a single motor. The housings of the motor and gearing units may have extended side walls which project above upper and lower walls to provide somewhat U-shaped guide channels. The ends of the housing may then have mating flanges which have bores for accepting fixing means such as nuts and bolts.

The invention may be understood more readily, and various other features of the invention may become apparent, from consideration of the following description.

BRIEF DESCRIPTION OF DRAWINGS

Embodiments of the invention will now be described, by way of examples only, with reference to the accompanying drawings, wherein:

FIG. 1 is a side view of a jib of a cutter-loader machine employing conveying apparatus made in accordance with the invention;

FIG. 2 is a plan view of the motor of the conveying apparatus;

FIG. 3 is a side view of the motor shown in FIG. 2;

DESCRIPTION OF PREFERRED EMBODIMENTS

Figures 4, 5:
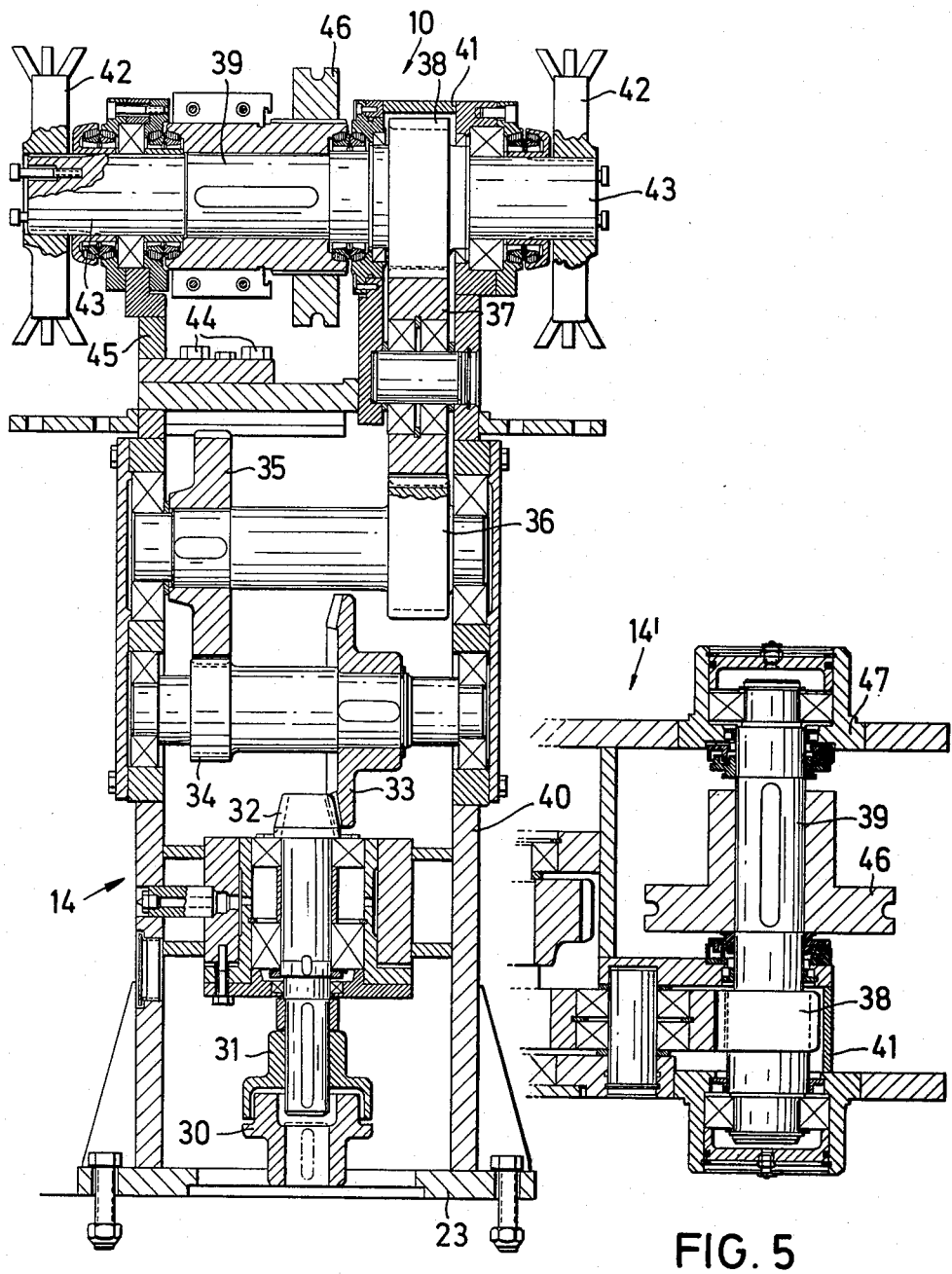
FIG. 4 is a sectional plan view of the reduction gearing unit of the conveying apparatus in conjunction with the chain-drive arrangement and cutting means.
FIG. 5 is a sectional plan view of part of an alternative form of the chain-drive arrangement.

Referring initially to FIGS. 1 to 3, there is shown in FIG. 1 a jib A of a cutter-loader machine. Such a machine is well known per se and is not therefore shown in the drawings. The jib A is connected at end B to the machine. Usually the end B of the jib A would be connected to a rotatable turntable so that the jib A can swing in a lateral sense. Means such as hydraulic piston and cylinder units, would also be attached to the end B of the jib A so that by operating this means the jib A can be raised and lowered. At the free end C of the jib A there is provided cutting means in the form of a cutting cylinder or drum or in this embodiment in the form of cutting wheels. This cutting means serves to detach material from a working face. The jib A is provided with conveying apparatus made in accordance with the invention, which serves to transfer material away from the cutting means and in the direction of arrow P. The transferred material can then be taken up by further conveying means such as an additional loading jib on the machine.

The conveying apparatus on the jib A is in the form of a scraper-chain assembly, denoted 12, employing one or several endless chains to which scraper elements are attached and spaced apart along the jib A. The scraper-chain assembly 12 is entrained around a rotatable member 11 at the end B of the jib A and around a rotatable member at the end C. The rotatable member at the end C forms part of the cutting means assembly and serves to directly drive the scraper-chain assembly so that the member 11 is freely rotatable. It is however possible to effect driving of the scraper chain assembly 12 by the member 11 so that the cutting means is rotated indirectly by the scraper-chain assembly. The scraper chain assembly 12 is circulated around the rotatable members and moves along guide channels. To effect driving of the scraper chain assembly and the cutting means there is provided an electric motor 13 and a reduction-ratio gearing unit 14. The motor 13 and the gearing unit 14 have housings which combine with a body section 24 of the jib A to form the guide channels for the scraper-chain assembly and provide structural parts of the jib A. Thus, as shown in FIGS. 2 and 3, the motor 13 has its rotor 15 disposed in a stator housing 13' provided with side walls 16, 17 projecting from its upper and lower walls. These side walls 16, 17, which are arranged symmetrically in relation to the longitudinal central plane M of the housing 13', provide the guide channels denoted 18, 19, within which the scraper-chain assembly 12 is moved. The channel 18 forms part of a conveying run and the upper face 20 of the motor housing 13' forms part of the conveying floor surface along which the scrapers of the assembly 12 transfer the material. The channel 19 forms part of a return run for the assembly 12. At the ends of the motor housing 13' there are provided flanges 21 which serve for the connection of the motor housing into the jib structure. The housing for the reduction-ratio gearing unit 14 is constructed in a similar fashion with side walls forming guide channels contiguous with the guide channels 18, 19 of the motor housings and with flanges 23 at one end. The flanges 23 of the gearing unit housing mate with the flanges 21 at one end of the motor housing 13' and the flanges 21 at the other end mate with corresponding flanges 22 of the body section 24. Nuts and bolts can be inserted through aligned bores in the flanges 21, 23 and 21, 22 to effect rigid connection between the components. The body section 24 is also constructed with side walls forming guide channels contiguous with the guide channels 18, 19 of the motor housing so that the guide channels of the components serve, in common, to guide the scraper elements of the assembly 12. Thus the cross-sectional profiles of the housings of the gearing unit 14 and the motor 13 and of the body sections 24 have the same generally U-shaped configuration.

Referring now to FIG. 4, the output shaft from the motor 13 is connected by means of a torque transmission coupling 30, 31 to the input shaft of the gearing unit 14. The housing of the unit 14 is designated 40. This input shaft carries a bevel gear 32 which meshes with a bevel gear 33 carried by a second shaft extending perpendicularly to the input shaft. This second shaft also carries a spur gear 34 which meshes with a spur gear 35 carried by a third shaft extending parallel to the second shaft. A spur gear 36 carried by the third shaft meshes with an intermediate spur gear 37 supported on a short journal and also meshing with a spur gear 38. This spur gear 38 is carried by a shaft 39 which forms the drive shaft for the cutting means of the jib and the scraper-chain assembly 12, i.e. the aforesaid rotatable member. The gears 37, 38 and the associated part of the shaft 39 are mounted in a sub housing 41 connected to the housing 40 for the gearing unit 14. A bracket 45 is connected with screws 44 to an end wall of the main housing 40 and this bracket 45 supports a bearing unit for the shaft 39. This bracket 45 enables the shaft 39 and associated parts to be readily assembled and disassembled. The housing 41 accommodates a corresponding bearing unit for the shaft 39. The shaft 39 projects outwardly through its bearing unit, i.e. laterally of the jib A, and has splined portions 43 which receive detachable cutting wheels 42, i.e. wheels equipped with cutting tools, constituting the aforementioned cutting means. A sprocket 46 is mounted on the shaft 39 between its bearing units. This sprocket 46 rotates with the shaft 39 and is drivably coupled with a central single chain of the scraper chain assembly 12 to effect driving thereof. The rotatable member 11 at the end B of the jib A merely serves to reverse the scraper-chain assembly and can take the form of a drum accommodating a central sprocket for engaging the chain of the assembly 12.

As mentioned previously, the drive of the scraper-chain assembly 12 can be effected via the rotatable member 11 at the end B of the jib A. In this case, the motor 13 and the gearing unit 14 would be located at the opposite end of the jib A in a mirror-image position with the body structure 12 at the other end. FIG. 5 depicts an arrangement at the end B of the jib for driving the scraper-chain assembly 12. The gearing unit, here denoted 14' and not shown in detail, is the same as that depicted in FIG. 4. As shown in FIG. 5, the intermediate spur gear (37 FIG. 4) taking up the output from the gearing unit 14' again meshes with a spur gear 38 carried on the shaft 39 forming the aforementioned rotatable member 11. The spur gear 38, the appropriate portion of the shaft 39 and a detachable bearing unit for the shaft 39 are again located in a sub-housing 41. The housing of the gearing unit 14' has an extended side wall opposite the sub-housing 41 which locates a complementary detachable bearing unit for the shaft 39. A drive-chain sprocket 46 is carried by the central portion of the shaft 39 to rotate therewith. This sprocket 46 engages with the single central chain of the scraper-chain assembly 12.

Although in the above description a sprocket 46 is shown for driving a single chain of the scraper-chain assembly 12 the construction can be modified to accommodate a scraper-chain assembly 12 employing two laterally-spaced chains.

It is also possible for the cutting means on the jib A to be omitted and for some other separate cutting means to effect detachment of the material. In this case, the jib A constitutes the conveying apparatus which merely serves to transfer the material detached by the separate cutting means.

In another modification a drive motor 13 and a reduction-ratio gearing unit 14, 14' can be provided at each end of the jib so that the scraper-chain assembly is driven at both ends.

We claim:

1. In conveying apparatus which comprises a scraper-chain assembly, support means which generally defines a longitudinal path along which the assembly can be moved at least part of said path being in the form of a generally U-shaped guide channel with a conveying surface located between side wall surfaces and drive means for moving the assembly along said path to effect transference of material; the improvement comprising providing an electric motor which constitutes at least part of said drive means and which has a stator housing, said stator housing of the motor forming a complete section of the support means, which section constitutes part of said path and guide channel and has a conveying surface between side wall surfaces extending across the full width of the guide channel and over a portion of the length thereof, the conveying surface and side wall surfaces of said section provided by the stator housing being substantially co-planar with the conveying surface and side wall surfaces of at least one adjacent adjoining portion of the remainder of the guide channel provided by the support means.

2. In conveying apparatus which comprises a scraper-chain assembly, support means which generally defines a longitudinal path along which the assembly can be moved, the path having first and second guide channels at opposite sides of the support means, each guide channel having a generally U-shaped profile with a conveying surface located between side wall surfaces and drive means for moving the assembly along said path to transfer material; the improvement comprising an electric motor which constitutes at least part of said drive means and which has a stator housing, the stator housing of the motor forming a complete section of the support means which constitutes parts of said path and of the upper and lower guide channels, the section defined by the stator housing having two opposite located conveying surfaces each extending between side wall surface and over the full width of the guide channels and over a portion of the length of each of the guide channels, each conveying surface and associates side wall surfaces of said section provided by the stator housing being aligned substantially co-planar with the conveying surface and side wall surfaces of at least one adjoining portion of the remainder of the upper and lower guide channels, respectively, provided by the support means.

3. In a jib for a cutter-loader machine having cutting means, a scraper chain conveyor with one end adjacent said cutting means, the conveyor including a scraper chain assembly and support means which defines a path extending longitudinally of the jib and having at least a part of the U-shaped cross-section producing a guide channel with a conveying surface and side wall surfaces along which the assembly is moved and drive means for driving the assembly along said path; the improvement comprising providing an electric motor which constitutes at least part of said drive means and which has a stator housing, said stator housing of the motor forming a complete section of the support means, which section constitutes part of said path and guide channel and has a conveying surface between side wall surfaces extending across the full width of the guide channel and over a portion of the length thereof, the conveying surface and side wall surfaces of said section provided by the stator housing being substantially co-plannar with the conveying surface and side wall surfaces of at least one adjacent adjoining portion of the remainder of the guide channel provided by the support means.

4. A jib for a cutter-loader machine having a conveying apparatus which comprises a scraper-chain assembly, support means which generally defines a longitudinal path along which the assembly can be moved at least part of said path being in the form of a generally U-shaped guide channel with a conveying surface located between side wall surfaces and drive means for moving the assembly along said path to effect transference of material; the improvement comprising providing an electric motor which constitutes at least part of said drive means and which has a stator housing, said stator housing of the motor forming a complete section of the support means, which section constitutes part of said path and guide channel and has a conveying surface between side wall surfaces extending across the full width of the guide channel and over a portion of the length thereof, the conveying surface and side wall surfaces of said section provided by the stator housing being substantially co-planar with the conveying surface and side wall surfaces of at least one adjacent adjoining portion of the remainder of the guide channel provided by the support means.

5. Apparatus according to claim 1, wherein said scraper-chain assembly is entrained around rotatable members at the ends of said guide channel and at least one of the rotatable members is driven by said motor to move the assembly.

6. Apparatus according to claim 1, wherein there are provided two oppositely-disposed guide channels, the section of the support means provided by the stator housing constituting a complete part of each guide channel with a conveying surface and side wall surfaces extending across the full width and over a portion of the length of said channel.

7. Apparatus according to claim 5, wherein the drive means further comprise a reduction-ratio gearing unit operably disposed between the motor and the driven rotatable member.

8. Apparatus according to claim 7, wherein the gearing unit has a housing forming a complete further section of the support means, which further section constitutes a further part of said path and guide channel and has a conveying surface between side wall surfaces extending across the full width of the guide channel and over a portion of the length thereof, the conveying surface and side wall surfaces of said further section provided by the housing of said gearing unit being substantially co-planar with the conveying surface and side wall surfaces of the first-mention section provided by the stator housing.

9. Apparatus according to claim 8, wherein the housing of the gearing unit is detachably secured at one end to one end of the stator housing.

10. Apparatus according to claim 8, wherein the remainder of the support means comprises a structural body section, the body section, the stator housing and the gearing unit housing having the same cross-sectional profile and being arranged end-to-end.

11. Apparatus according to claim 5, wherein at least one of the rotatable members is a shaft carrying a sprocket wheel drivably engageable with a chain of the scraper-chain assembly.

12. Apparatus according to claim 7, wherein at least one of the rotatable members is a shaft carrying a sprocket wheel drivably engageable with a chain of the scraper-chain assembly, the shaft also carrying a spur gear driven by the output from said gearing unit.

13. Apparatus according to claim 12, wherein there is provided a sub-housing attached to the housing of the gearing unit and the shaft is located in bearing units, one of the bearing units and said spur gear being located in the sub-housing.

14. A jib according to claim 3, wherein the cutting means is driven by the scraper-chain assembly.

15. A jib according to claim 3, wherein the cutting means is located at one end of the jib and is driven by said motor.

* * * * *